United States Patent
Chuang et al.

(10) Patent No.: US 9,179,070 B2
(45) Date of Patent: Nov. 3, 2015

(54) METHOD FOR ADJUSTING FOCUS POSITION AND ELECTRONIC APPARATUS

(71) Applicant: Altek Semiconductor Corp., Hsinchu (TW)

(72) Inventors: Che-Lun Chuang, Hsinchu (TW); Yun-Chin Li, New Taipei (TW); Chia-Chun Tseng, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 136 days.

(21) Appl. No.: 14/013,039

(22) Filed: Aug. 29, 2013

(65) Prior Publication Data

US 2015/0002724 A1    Jan. 1, 2015

(30) Foreign Application Priority Data

Jun. 27, 2013   (TW) .............................. 102122985 A

(51) Int. Cl.
| | | |
|---|---|---|
| *H04N 5/232* | (2006.01) | |
| *G06K 9/40* | (2006.01) | |
| *G03B 3/00* | (2006.01) | |
| *H04N 5/262* | (2006.01) | |

(52) U.S. Cl.
CPC ....... *H04N 5/23293* (2013.01); *H04N 5/23212* (2013.01); *H04N 5/23229* (2013.01); *H04N 5/2621* (2013.01)

(58) Field of Classification Search
CPC .......................... H04N 5/2356; H04N 5/23212
USPC ............................. 348/346; 382/255; 396/89
See application file for complete search history.

(56) References Cited

U.S. PATENT DOCUMENTS

| | | | |
|---|---|---|---|
| 2008/0219654 A1* | 9/2008 | Border et al. ................... | 396/89 |
| 2012/0070097 A1 | 3/2012 | Adams, Jr. | |
| 2012/0105690 A1* | 5/2012 | Waqas et al. .................. | 348/252 |
| 2012/0200673 A1* | 8/2012 | Tagawa et al. .................. | 348/46 |
| 2014/0240578 A1* | 8/2014 | Fishman et al. .......... | 348/333.08 |

FOREIGN PATENT DOCUMENTS

| | | |
|---|---|---|
| CN | 101632296 | 1/2010 |
| CN | 103037075 | 4/2013 |
| TW | 201216203 | 4/2012 |
| TW | I383332 | 1/2013 |
| TW | 201519155 | 5/2015 |

OTHER PUBLICATIONS

"Office Action of Taiwan Counterpart Application", issued on Jul. 8, 2015, p1-p4.

* cited by examiner

*Primary Examiner* — Twyler Haskins
*Assistant Examiner* — Quang Le
(74) *Attorney, Agent, or Firm* — Jianq Chyun IP Office

(57) ABSTRACT

A method for adjusting focus position and an electronic apparatus are provided. Herein, a depth map is obtained according to a first image and a second image which are captured by a first lens and a second lens, respectively. A plurality of depth values included in the depth map is compared with a depth of field (DOF) table for obtaining a plurality of focus distances. An All-in-Focus (AIF) image is generated according to a plurality of focus images captured by the first lens with the focus distances, respectively. A blur process is executed for a plurality of pixels excluding a focus selected location in the AIF image, so as to obtain an adjusting image.

10 Claims, 3 Drawing Sheets

METHOD FOR ADJUSTING FOCUS POSITION AND ELECTRONIC APPARATUS

CROSS-REFERENCE TO RELATED APPLICATION

This application claims the priority benefit of Taiwan application serial no. 102122985, filed on Jun. 27, 2013. The entirety of the above-mentioned patent application is hereby incorporated by reference herein and made a part of this specification.

BACKGROUND OF THE INVENTION

1. Field of the Invention

This invention generally relates to an image processing method and an apparatus, and more particularly to a method for adjusting focus position and an electronic apparatus using the same.

2. Description of Related Art

Accompanying with the advancement of the optical projection technology, cameras having adjustable aperture, shutter or even replaceable lenses are gradually popularized, and functionalities of the cameras also tend to more diversified. When a camera is used to capture an image, in order to bring out a theme of the captured image, a capturing technique known as shallow depth of field is generally adopted by focusing a lens of the camera onto a specific distance range in the image, such that objects within the specific distance range can be clearly rendered while gradually blurring other objects outside of the specific distance range. A so-called depth of field (DOF) is used to describe a distance range for clearly rendering the image in a space.

However, the shallow depth of field that can be generated by a normal camera lens provides only limited effects, and in order to obtain a more preferable shallow depth of field, a lens with an large aperture is required to enhance blur process to distant objects, so that the theme that is clearly rendered can be bring out from background. However, the lens with large aperture is usually huge in size and high in price, which cannot be easily provided to a general consumer camera. Accordingly, a technical problem to be solved in the field is to generate an image with shallow depth of field by using a consumer camera of lower level.

SUMMARY OF THE INVENTION

The invention is directed a method for adjusting focus position and an electronic apparatus, in which an image post-process is utilized to adjust the focus position.

A method for adjusting focus position of the invention is suitable for an electronic apparatus. The method includes: obtaining a depth map according to a first image and a second image which are respectively captured by a first lens and a second lens; obtaining a plurality of focus distances by comparing a plurality of depth values included in the depth map with a depth of field table; generating an all-in-focus image according to a plurality of focus images captured by the first lens respectively with the focus distances; and obtaining an adjusting image by executing a blur process for a plurality of pixels excluding a focus selected location in the all-in-focus image.

In an embodiment of the invention, after the all-in-focus image is generated, the all-in-focus image is displayed, and the focus selected location that is selected in the all-in-focus image by a user is received.

In an embodiment of the invention, in the step of obtaining the adjusting image by executing the blur process for the pixels excluding the focus selected location in the all-in-focus image, a designated depth value corresponding to the focus selected location is obtained from the depth map, and the depth values corresponding to each of the pixels respectively is compared with the designated depth value to execute the blur process for each of the pixels.

In an embodiment of the invention, in the step of comparing the depth values corresponding to the pixels respectively with the designated depth value, a blur level corresponding to each of the pixels is adjusted according to a difference value between each of the depth values and the designated depth value, and the blur process is executed for the pixels according to the blur level.

In an embodiment of the invention, after the step of generating the all-in-focus image according to the focus images, a blur strength value is received, and a range of the blur level is decided according to the blur strength value.

In an embodiment of the invention, in the step of obtaining the depth map according to the first image and the second image which are respectively captured by the first lens and the second lens, the first image and the second image are simultaneously captured by the first lens and the second lens respectively with a base focus; a horizontal shift value of the first image and the second image is calculated; and the depth map is obtained by using the first image as a reference according to a lens distance between the first lens and the second lens, the base focus and the horizontal shift value.

In an embodiment of the invention, the depth of field table is built in the electronic apparatus.

An electronic of the invention includes an image capturing unit, a storage unit and a processing unit. The image capturing unit includes a first lens and a second lens. The storage unit stores images captured by the image capturing unit. The processing unit is coupled to the image capturing unit and the storage unit, and configured to execute an image processing module. The image processing module includes: a depth map capturing module that obtains a depth map according to a first image and a second image which are respectively captured by a first lens and a second lens; a comparing module that obtains a plurality of focus distances by comparing a plurality of depth values included in the depth map with a depth of field table; an all-in-focus generation module that generates an all-in-focus image according to a plurality of focus images captured by the first lens respectively with the focus distances; and a focus adjusting module that obtains an adjusting image by executing a blur process for a plurality of pixels excluding a focus selected location in the all-in-focus image.

In an embodiment of the invention, the electronic apparatus further includes: a display module that displays the all-in-focus image; and an input module that receives the focus selected location which is selected in the all-in-focus image by a user.

In an embodiment of the invention, the input module receives a blur strength value, and the focus adjusting module decides a range of a blur level according to the blur strength value.

In an embodiment of the invention, the focus adjusting module obtains a designated depth value corresponding to the focus selected location from the depth map, compares the depth values corresponding to each of the pixels respectively with the designated depth value for obtaining a difference value between each of the depth values and the designated depth value, adjusts the blur level corresponding to each of the pixels according to the difference value, and executes the blur process for each of the pixels according to the blur level.

In an embodiment of the invention, the first image and the second image are simultaneously captured by the first lens and the second lens respectively with a base focus. The depth map capturing module calculates a horizontal shift value of the first image and the second image, and obtains the depth map by using the first image as a reference according to a lens distance between the first lens and the second lens, the base focus and the horizontal shift value.

In summary, the invention obtains the all-in-focus image by utilizing an image post process, and adjusts the focus position in the all-in-focus image, so that the captured image can provide an effect of shallow depth of field. Accordingly, the method of the invention may be utilized for obtaining the same effect of shallow depth, even for those electronic apparatuses without high level equipments such as the large aperture.

To make the above features and advantages of the disclosure more comprehensible, several embodiments accompanied with drawings are described in detail as follows.

DESCRIPTION OF THE EMBODIMENTS

The invention proposes a method for adjusting focus position and an electronic apparatus, in which after an image is captured, an adjusting image being refocused can be generated according to a focus selected location by utilizing an image post process. In order to make the invention more comprehensible, embodiments are described below as the examples to prove that the invention can actually be realized.

Figure 1:
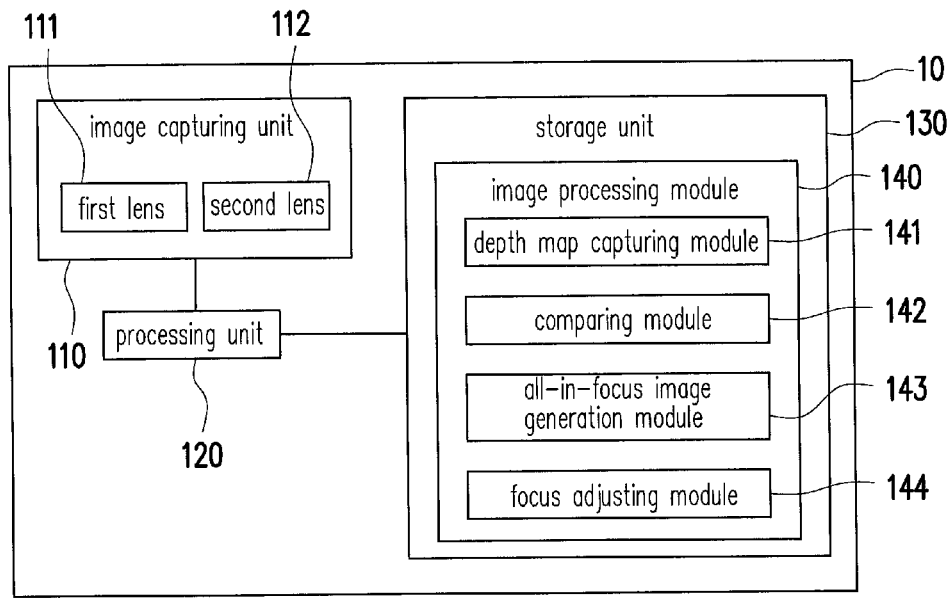
FIG. 1 is a block diagram of an electronic apparatus according to an embodiment of the invention.

FIG. 1 is a block diagram of an electronic apparatus according to an embodiment of the invention. Referring to FIG. 1, an electronic apparatus 10 of the present embodiment is, for example, a mobile phone, a smart phone, a personal digital assistant (PDA), a PDA phone, a notebook computer or tablet computer, and including an image capturing unit 110, a processing unit 120 and a storage unit 130.

The image capturing unit 110 includes a first lens 111 and a second lens 112 which are configured to capture images. The first lens 111 and the second lens 112 are, for example, a standard lens, a wide-angle lens or a zoom lens. Among the first lens 111 and the second lens 112, one being a left lens (configured to capture a left-eye image), whereas another one being a right lens (configured to capture a right-eye image). Moreover, the image capturing unit 110 may also include a photosensitive element or a diaphragm, but the invention is not limited thereto. The photosensitive element is, for example, a charge coupled device (CCD), a complementary metal-oxide semiconductor (CMOS) device or other devices. It is emphasized that above-mentioned examples are not intended to limit the invention.

The storage unit 130 is, for example, a fixed or a movable device in any possible forms including a random access memory (RAM), a read-only memory (ROM), a flash memory, a hard drive or other similar devices, or a combination of the above-mentioned devices. In the present embodiment, the storage unit 130 is recorded with an image processing module 140 capable of being executed by the processing unit 120.

The processing unit 120 is, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processing unit 120 is coupled to the image capturing unit 110 and the storage unit 130, and configured to access and execute the image processing module 140 recorded in the storage unit 130, so as to execute a function of adjusting focus position.

The image processing module 140 is, for example, a program code segment written by a computer programming language, and the program code segment is stored in the storage unit 130, included with a plurality of commands, and executed by the processing unit 120. Moreover, in other embodiments, the image processing module 140 can also be a hardware component composed by one or more circuits, and the hardware component is coupled to the processing unit 120 and driven by the processing unit 120, but the invention is not limited thereto. Herein, the image processing module 140 includes a depth map capturing module 141, a comparing module 142, an all-in-focus image generation module 143 and a focus adjusting module 144. Detailed steps of adjusting focus position executed by the electronic apparatus 10 are as described in the following embodiment.

Figure 2:
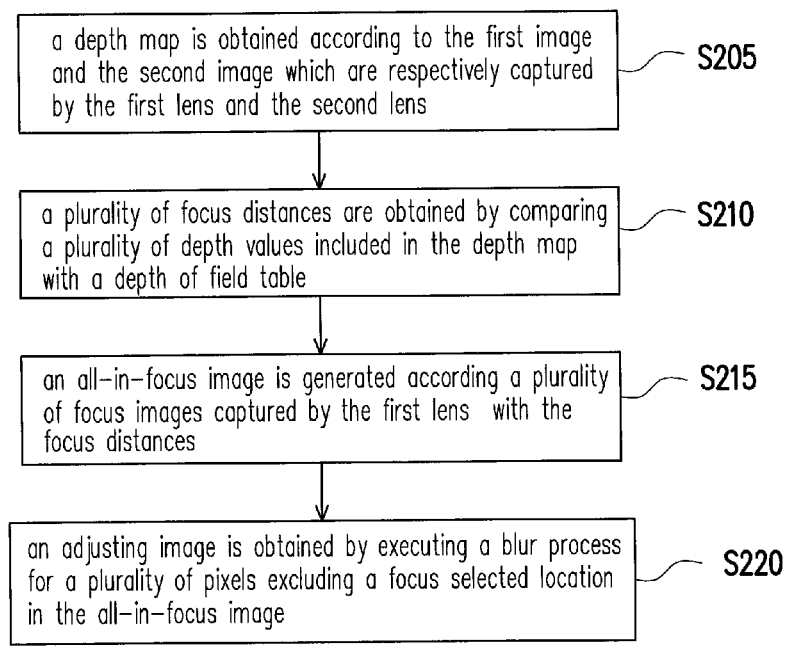
FIG. 2 is a flowchart of a method for adjusting focus position according to an embodiment of the invention.

FIG. 2 is a flowchart of a method for adjusting focus position according to an embodiment of the invention. A method of the present embodiment is suitable for the electronic apparatus 10 depicted in FIG. 1. The following detailed steps are elaborated to describe the method for adjusting focus position of the present embodiment with the reference to each element of the electronic apparatus 10.

First, in step S205, the depth map capturing module 141 obtains a depth map according to a first image and a second image which are respectively captured by the first lens 111 and the second lens 112. The depth map is configured to record one or more depth values from a base line of the first lens 111 and the second lens 112 to one or more objects to be observed. Herein, the first image is used as a reference, and the depth value of each pixel in the first image is calculated.

More specifically, the first image and the second image are simultaneously captured by the first lens 111 and the second lens 112 respectively with an identical parameter. The parameter may include a base focus, an aperture, a shutter, a white balance, but the invention is not limited thereto. Subsequently, the depth map capturing module 141 calculates a horizontal shift value of the first image and the second image. Therein, for the object that is closer to the first lens 111 and the second lens 112, the horizontal shift value of the first image and the second image is getting greater, whereas for the object that is farther from the first lens 111 and the second lens 112, the horizontal shift value of the first image and the second image is getting smaller. Next, using the first image as the reference, the depth map capturing module 141 obtains the depth map according to a lens distance between the first lens 111 and the second lens 112, the base focus and the horizontal shift value.

Figure 3:
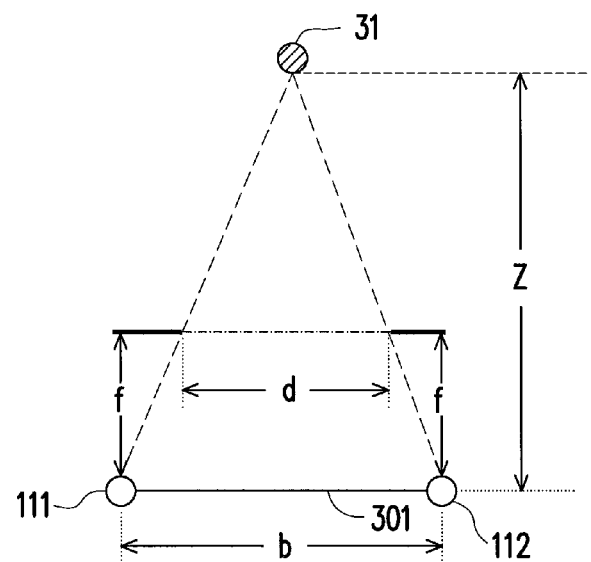
FIG. 3 is a schematic diagram for calculating a depth value according to an embodiment of the invention.

For instance, FIG. 3 is a schematic diagram for calculating a depth value according to an embodiment of the invention. In FIG. 3, a line connecting the first lens 111 with the second lens 112 is generally known as a base line 301. Since the first lens 111 shifts in a horizontal direction away from the second lens 112, there is a horizontal shift value d (disparity) in the horizontal direction between an object 31 in the first image and the object 31 in the second image. In the present embodiment, it is assumed that the base focus of the first lens 111 and the second lens 112 is f, and the lens distance between the first lens 111 and the second lens 112 is b, so that a depth value Z can be calculated with a formula of $Z=(b\times f)/d$, and the depth map is thereby obtained.

Subsequently, in step S210, the comparing module 142 obtains a plurality of focus distances by comparing a plurality of depth values included in the depth map with a depth of field table. Herein, the depth of field table records a plurality of focus distances as well as a depth of field corresponding to each of the focus distances. It can be known from the depth map and the depth of field table that, how many captured images of a scene are required to include all depth of fields of the scene, and the focus distances for the captured images can also be decided accordingly. The depth of field table is as shown in Table 1, in which one focus distance has one corresponding depth of field. The depth of field table of Table 1 is merely an example; it is not limited in practical uses.

TABLE 1

| Focus distance | Depth of field |
| --- | --- |
| 50 cm | 40 cm to 60 cm |
| 75 cm | 60 cm to 80 cm |
| 105 cm | 80 cm to 110 cm |

Thereafter, in step S215, the all-in-focus generation module 143 generates an all-in-focus image according a plurality of focus images captured by the first lens 111 (due to the depth map being calculated based on the first image) with above-mentioned focus distances. The all-in-focus image is a photo that is all clear from foreground to background. For instance, N focal distances $F\_1$ to $F\_N$ are obtained in step S210, that is, the depth of fields of the focal distances $F\_1$ to $F\_N$ include all of the depth values recorded in the depth map. Subsequently, by using the first lens 111, a focus image $I\_1$ is captured with the focus distance $F\_1$, a focus image $I\_2$ is captured with the focus distance $F\_2$, . . . , and a focus image $I\_N$ is captured with the focus distance $F\_N$. Thereafter, the all-in-focus generation module 143 generates the all-in-focus image including all of the depth of fields of the scene, from the focus images $I\_1$ to $I\_N$ with an all-in-focus algorithm.

Thereafter, in step S220, the focus adjusting module 144 obtains an adjusting image by executing a blur process for a plurality of pixels excluding a focus selected location in the all-in-focus image. In other words, the all-in-focus image is refocused so that the focus position is changed. For instance, after the all-in-focus image is generated, the electronic apparatus 10 displays the all-in-focus image, and receives the focus selected location that is selected in the all-in-focus image by a user, and then the blur process is executed for the pixels excluding the focus selected location in the all-in-focus image. Another embodiment is given for illustration below.

Figure 4:
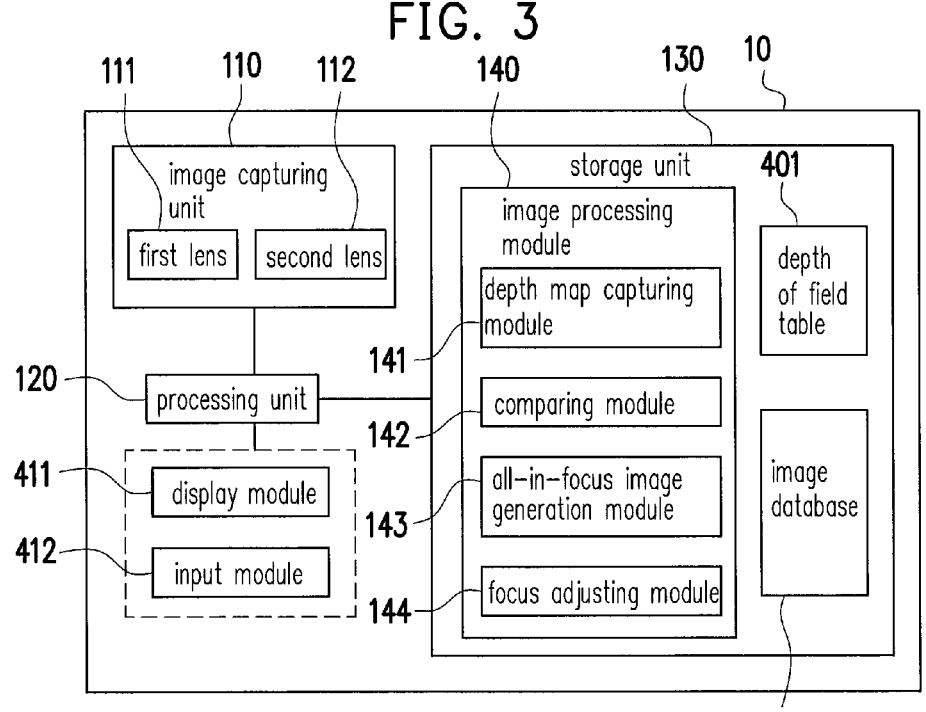
FIG. 4 is a block diagram of an electronic apparatus according to another embodiment of the invention.

FIG. 4 is a block diagram of an electronic apparatus according to another embodiment of the invention. Other members in the electronic apparatus 10 are further described in the present embodiment. Referring to FIG. 4, the storage unit 130 further includes a depth of field table 401 and an image database 402. That is, the depth of field table 401 is built in the electronic apparatus 10. The image database 402 is configured to store the images captured by the image capturing unit 110. In addition, the electronic apparatus 10 further includes a display module 411 and an input module 412. The display module 411 is, for example, a display configured to display the all-in-focus image. The input module 412 is, for example, a button, a touch panel or a microphone, configured for the user to select a focus selected location in the all-in-focus image.

In addition, the display module 411 and the input module 412 can be integrated into a touch screen in which the all-in-focus image is displayed, and the user can select the focus selected location on the touch screen for refocusing. An embodiment is given for illustration below.

Figure 5:
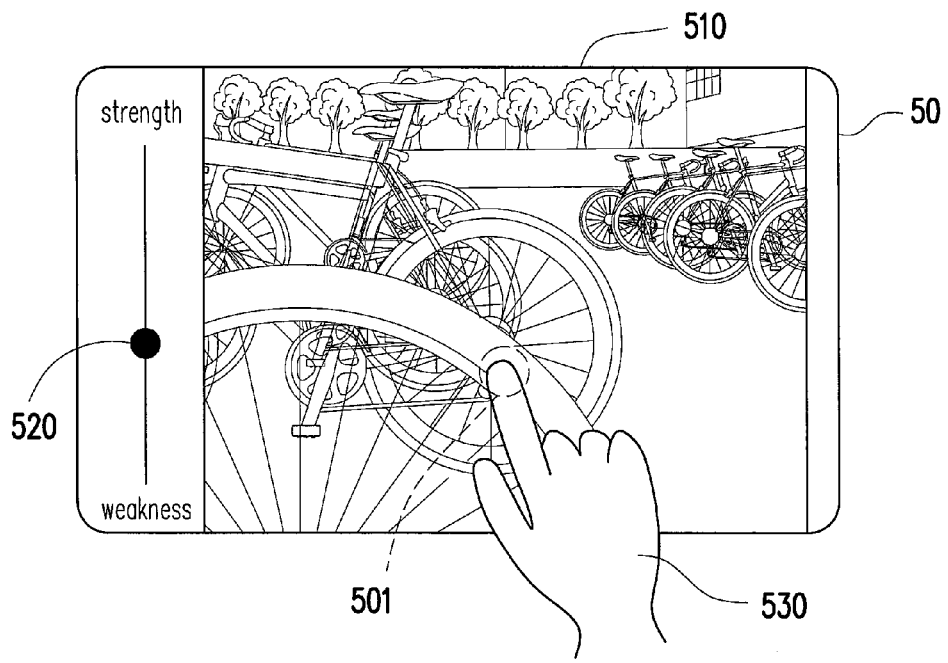
FIG. 5 is a schematic diagram for displaying an all-in-focus image according to an embodiment of the invention.

FIG. 5 is a schematic diagram for displaying an all-in-focus image according to an embodiment of the invention. Referring to FIG. 5, an all-in-focus image 510 is displayed in a touch screen 50, and the method for obtaining the all-in-focus image can refer to the description for steps S205 to S215. Accordingly, the user is capable of selecting a location on the touch screen 50 for refocusing. Moreover, in the present embodiment, while the touch screen 50 is displaying the all-in-focus image 510, a strength controlling function bar 520 can also be displayed, so that the user may select a blur strength value of background at the same time, and a range of a blur level for the background can be decided according to the blur strength value. The strength controlling function bar 520 is configured to, for example, simulate changes in aperture size.

As shown in FIG. 5, the user clicks on a focus selected location 501 by a finger 530, so as to select a tire in forefront for refocusing. After the focus selected location 501 is received by the input module 411, the focus adjusting module 144 obtains the depth value corresponding to the focus selected location 501 (i.e, a designated depth value D_preserve) from the depth map. Subsequently, the depth value corresponding to each of the pixels is compared respectively with the designated depth value, so that a difference value between each of the depth values and the designated depth value is obtained, and then the blur level corresponding to each of the pixels is adjusted according to the difference value. Lastly, the focus adjusting module 144 executes the blur process for each of the pixels according to the blur level. The blur process can be, for example, a Gaussian filter blur algorithm or a bilateral filter blur algorithm.

For instance, the blur process is not executed on the pixels with the depth value that is identical to the designated depth value D_preserve, whereas for the pixels with the depth value that is not identical to the designated depth value D_preserve, the blur process can be decided according to the difference value between the depth value and the designated depth value D_preserve. For instance, the blue level corresponding to each of the pixels can be adjusted according to the difference value between each of the depth value and the designated depth value, and the blur process is executed on each of the pixel according to the blur level. The difference value being greater indicates that an actual position corresponding to the pixel is farther away from a focal plane, thus the blur level is greater. Otherwise, the difference value being smaller indicates that the actual position corresponding to the pixel is closer to the focal plane, thus the blur level is smaller.

Figure 6:
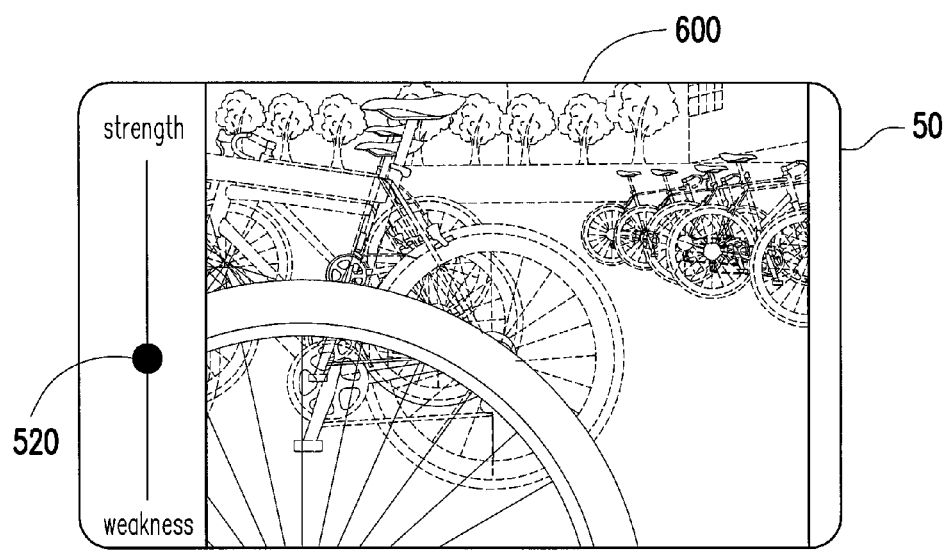
FIG. 6 is a schematic diagram illustrating an adjusting image according to an embodiment of the invention.

With the blur strength value selected according to the focus selected location 501 and the strength controlling function bar 520, an adjusting image 600 depicted in FIG. 6 can be obtained. FIG. 6 is a schematic diagram illustrating an adjusting image according to an embodiment of the invention. In FIG. 6, for the convenience of the description, the foreground, being an area (where the tire at forefront is) having the same depth value with the focus selected location 501, is only illustrated in full line, and the background is only illustrated in dotted line, and the blur level is not exhibited in FIG. 6. However, it can be realized that, in an actual image presentation, the background has different blur levels according to the difference values. In addition, after the adjusting image 600 is displayed, the blur strength value thereof can still be adjusted through the strength controlling function bar 520.

In summary, in the foregoing embodiments, two lenses are utilized to obtain the left-image and the right-image, so that the depth map can be thereby obtained. The all-in-focus image can be generated according to the depth map. The adjusting image being refocused can then be generated according to the all-in-focus image. Accordingly, the image post process can be utilized for the user to selected the focus position for refocusing, and adjust the blur strength value excluding the area other than the focus selected location, so that the adjusting image may obtained an effect of large aperture.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for adjusting focus position, for an electronic apparatus, the method comprising:
   obtaining a depth map according to a first image and a second image which are respectively captured by a first lens and a second lens, comprises:
      simultaneously capturing the first image and the second image by the first lens and the second lens respectively with a base focus;
      calculating a horizontal shift value of the first image and the second image; and
      obtaining the depth map by using the first image as a reference according to a lens distance between the first lens and the second lens, the base focus and the horizontal shift value;
   obtaining a plurality of focus distances by comparing a plurality of depth values included in the depth map with a depth of field table;
   generating an all-in-focus image according to a plurality of focus images captured by the first lens respectively with the focus distances; and
   obtaining an adjusting image by executing a blur process for a plurality of pixels excluding a focus selected location in the all-in-focus image.

2. The method of claim 1, wherein after the step of generating the all-in-focus image, further comprising:
   displaying the all-in-focus image, and receiving the focus selected location that is selected in the all-in-focus image by a user.

3. The method of claim 1, wherein the step of obtaining the adjusting image by executing the blur process for the pixels excluding the focus selected location in the all-in-focus image comprises:
   obtaining a designated depth value corresponding to the focus selected location from the depth map; and
   comparing the depth values corresponding to the pixels respectively with the designated depth value to execute the blur process for the pixels.

4. The method of claim 3, wherein the step of comparing the depth values corresponding to the pixels respectively with the designated depth value comprises:
   adjusting a blur level corresponding to each of the pixels according to a difference value between each of the depth values and the designated depth value; and
   executing the blur process for each of the pixels according to the blur level.

5. The method of claim 4, wherein after the step of generating the all-in-focus image according to the focus images, further comprising:
   receiving a blur strength value; and
   deciding a range of the blur level according to the blur strength value.

6. The method of claim 1, wherein the depth of field table is built in the electronic apparatus.

7. An electronic apparatus, comprising:
   an image capturing unit including a first lens and a second lens;
   a storage unit storing images captured by the image capturing unit; and
   a processing unit coupled to the image capturing unit and the storage unit, and configured to execute an image processing module, wherein the image processing module comprises:
   a depth map capturing module obtaining a depth map according to a first image and a second image which are respectively captured by the first lens and the second lens;
   a comparing module obtaining a plurality of focus distances by comparing a plurality of depth values included in the depth map with a depth of field table;
   an all-in-focus generation module generating an all-in-focus image according to a plurality of focus images captured by the first lens respectively with the focus distances; and
   a focus adjusting module obtaining an adjusting image by executing a blur process for a plurality of pixels excluding a focus selected location in the all-in-focus image;
   wherein the first image and the second image are simultaneously captured by the first lens and the second lens respectively with a base focus;
   wherein the depth map capturing module calculates a horizontal shift value of the first image and the second image, and obtains the depth map by using the first image as a reference according to a lens distance between the first lens and the second lens, the base focus and the horizontal shift value.

8. The electronic apparatus of claim 7, wherein the electronic apparatus further comprises:
   a display module displaying the all-in-focus image; and
   an input module receiving the focus selected location which is selected in the all-in-focus image by a user.

9. The electronic apparatus of claim 8, wherein the input module receives a blur strength value, and the focus adjusting module decides a range of a blur level according to the blur strength value.

10. The electronic apparatus of claim 9, wherein the focus adjusting module obtains a designated depth value corresponding to the focus selected location from the depth map, compares the depth values corresponding to the pixels respectively with the designated depth value for obtaining a difference value between each of the depth values and the designated depth value, adjusts the blur level corresponding to each of the pixels according to the difference value, and executes the blur process for each of the pixels according to the blur level.

* * * * *